United States Patent [19]

Zavodny

[11] Patent Number: 4,492,290

[45] Date of Patent: Jan. 8, 1985

[54] ACCELERATION SENSITIVE COMPRESSION HEAD

[75] Inventor: Eugene N. Zavodny, Bloomingdale, Ill.

[73] Assignee: Maremont Corporation, Carol Stream, Ill.

[21] Appl. No.: 457,437

[22] Filed: Jan. 12, 1983

[51] Int. Cl.³ ............................................. F16F 9/34
[52] U.S. Cl. ............................................. 188/322.14
[58] Field of Search ........... 188/275, 279, 280, 322.11, 188/322.13, 322.14, 322.15

[56] References Cited

U.S. PATENT DOCUMENTS

| 2,375,377 | 5/1945 | Mitereff. | |
|---|---|---|---|
| 2,431,966 | 12/1947 | Rossman. | |
| 2,512,269 | 6/1950 | Ezbelent. | |
| 2,774,448 | 12/1956 | Hultin. | |
| 2,886,142 | 5/1959 | Orshansky, Jr.. | |
| 2,942,867 | 6/1960 | Rumsey. | |
| 3,114,705 | 12/1963 | Pribonic et al.. | |
| 3,127,958 | 4/1964 | Szostak. | |
| 3,194,262 | 7/1965 | Hamilton et al. | 188/322.14 X |
| 3,319,741 | 5/1967 | Hauck. | |
| 3,338,347 | 8/1967 | Avner. | |
| 3,414,092 | 12/1968 | Speckhart. | |
| 3,656,633 | 4/1972 | Ostwald. | |
| 3,696,894 | 10/1972 | Brady et al.. | |
| 3,757,910 | 9/1973 | Palmer | 188/322.14 |
| 4,356,898 | 11/1982 | Guzder et al.. | |

FOREIGN PATENT DOCUMENTS

| 2221944 | 11/1972 | Fed. Rep. of Germany | 188/322.14 |
|---|---|---|---|
| 2090643 | 7/1982 | United Kingdom | 188/322.14 |

OTHER PUBLICATIONS

"The Design of a Shock Absorber to Improve Ride Comfort by Reducing Jerk", published by Society of Automotive Engineers, dated May 20–24, 1968.

Primary Examiner—Duane A. Reger
Attorney, Agent, or Firm—Allegretti, Newitt, Witcoff & McAndrews

[57] ABSTRACT

An acceleration sensitive automotive shock absorber includes an improved compression head assembly. Within a cup inside the head, a biased mass slides relative to a pin joined to the cup, to open a unique path of fluid flow during accelerating compression of the shock absorber.

9 Claims, 8 Drawing Figures

ACCELERATION SENSITIVE COMPRESSION HEAD

BACKGROUND OF THE INVENTION

This invention relates to acceleration sensitive automotive shock absorbers, and more particularly, to an improved compression head assembly providing the acceleration sensitivity.

In the art of automotive shock absorbers, several attempts have been made to provide an acceleration sensitive automotive shock absorber. The desired benefit of such a shock absorber has been an automobile ride free of undesirable jarring of the automobile occupants and contents caused by encounter of the automobile wheels with the sudden shock of such harsh road conditions as potholes and grade discontinuities. Since it is elementary that a mass is sensitive to acceleration due to its mass or inertia, in that a mass at rest tends to remain at rest, attempts to develop acceleration sensitive automotive shock absorbers have centered upon the inclusion in such shock absorbers of masses which remain at rest while the wheel-connected components of the shock absorbers accelerate with the wheels. This relative motion between the mass and wheel-connected components of the shock absorbers has been used to uncover or cover valve openings in the shock absorbers, providing fluid paths either uniquely open during periods of operation, or uniquely closed during such times.

The following patents disclose such prior art attempts at providing acceleration sensitive automotive shock absorbers as are known to the inventor:

| Number | Inventor |
| --- | --- |
| 3,414,092 | Speckhart |
| 2,512,269 (French) | Ezbelent |
| 2,375,377 | Miteroff |
| 2,774,448 | Hultin |
| 3,127,958 | Szostak |
| 2,886,142 | Orshansky |
| 3,338,347 (English) | Avner |

The following patents disclose non-automotive attempts:

| Number | Inventor |
| --- | --- |
| 2,942,867 | Rumsey |
| 3,656,633 (German) | Ostwald |
| 3,696,894 | Brady |
| 3,114,705 | Pribonic |
| 3,319,741 (German) | Hauck |

Despite the existence of these disclosures, no commercially mass-produced acceleration sensitive automotive shock absorber is known to exist. A study of the disclosures reveals that problems of reliability, performance, fabrication, compatability with other shock absorber objectives and parameters, design adaptation to specific vehicles, installation, weight and cost may have prevented commercial exploitation of the known devices. As examples, clogging or fatigue may cause a lack of performance stability of the devices. The noise of fluid movement through the valving may be excessive. Dependence on gravity may eliminate the devices from non-vertical applications. Finally, precision machining may inflate costs.

SUMMARY OF THE INVENTION

With the foregoing as background, a principal object of this invention is to provide a commercially feasible acceleration sensitive automotive shock absorber, with satisfaction of all the objects of reliability, performance, etc., which the principal object implies.

Thus, in a principal aspect, the invention of this specification is an acceleration sensitive automotive shock absorber including an improved automotive shock absorber compression head assembly, which provides the acceleration sensitivity.

The compression head assembly includes a compression head with a wall portion and a ledge portion, preferably with orifice and restriction valve seats on the ledge portion. The head defines a space within the wall portion, an opening through the ledge portion, and orifice and restriction valve openings among the seats. A valve disk is loosely mounted in the head space, adjacent the valve seats and openings. A cup defining a chamber is slidably mounted in the head space, adjacent the disk and away from the valve seats and openings. A pin defining a passage is mounted to the cup in the chamber. A mass is slidably mounted to the pin in the chamber for movement to and from a position closing the passage. A biasing means biases the mass to the position closing the valve, and a retaining means holds the assembly together.

BRIEF DESCRIPTION OF THE DRAWING

The accompanying drawing includes eight figures, or views, in which parts depicted in two or more figures are identified with the same numbers throughout. Each figure is briefly described as follows.

In the following description, terms of spatial orientation such as "top" and "bottom" are used in describing the preferred embodiment. Except to the extent included in the claims, these terms are meant as an aid to understanding the description and drawing, and not as a limitation on the orientation of the shock absorber or compression head of the description.

DETAILED DESCRIPTION OF THE PREFERRED EMBODIMENT

Figure 1:
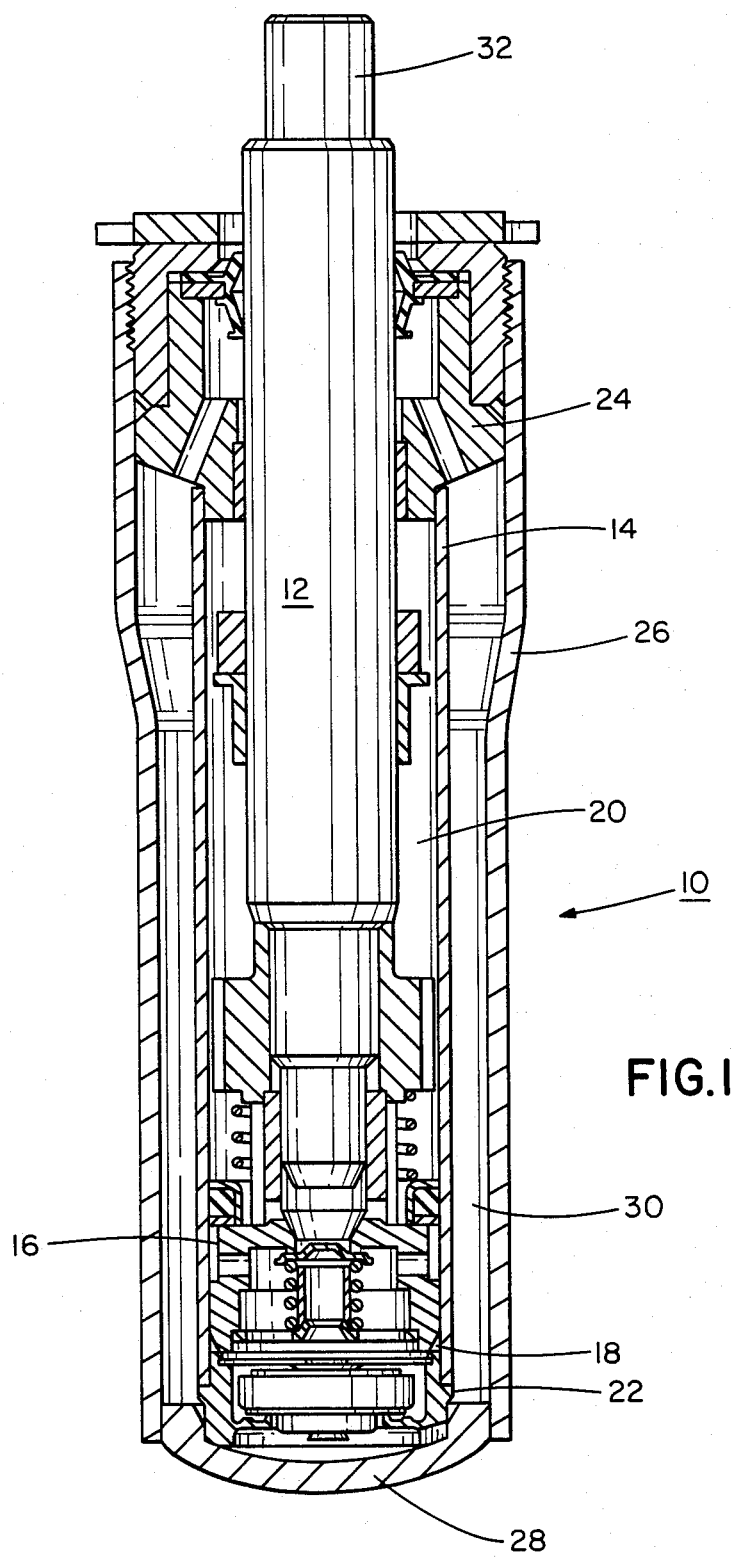
FIG. 1 is a cross-sectional view of a shock absorber including the improved compression head of this invention.

Referring to FIG. 1; the preferred embodiment of the invention is, in a principal aspect, an acceleration sensitive shock absorber 10. A piston rod 12 of the shock absorber 10 is slidably mounted within an inner tube or cylinder member 14, and has a piston valving assembly 16 mounted on its lower end.

The assembly 16 regulates flow of a hydraulic fluid across the assembly 16 between a compression chamber 18 and a rebound chamber 20. The chambers 18, 20 are variable in volume, and so vary with movement of the piston rod 12. The chamber 18 is defined by the lower surfaces of the piston valving assembly 16, the inner walls of the inner tube 14 and the top surfaces of a compression head assembly 22. The rebound chamber 20 is defined by the top surfaces of the piston valving assembly 16, the outer surface of the piston rod 12, the inner walls of the inner tube 14 and a seal assembly 24.

As the piston rod 12 moves downward or the cylinder 14 upward, during a compression stroke, the compression chamber 18 decreases in volume, while the rebound chamber 20 increases in volume, at a lower rate of change. Hydraulic fluid flows, in part, from the compression chamber 18 into the rebound chamber 20. On return of the piston rod 12, during a recoil stroke, the flow pattern is reversed. As the shock absorber 10 is depicted in FIG. 1, the piston rod 12 is bottomed in the cylinder 14, the compression chamber 18 is at a minimum volume, and the rebound chamber 20 is at maximum volume.

Also as shown in FIG. 1, the seal assembly 24 caps the upper end of the cylinder 14, while the compression head assembly 22 caps the lower end. An intermediate tube or cylinder 26, a lower end cap 28 and a lower mounting connector (not shown) complete the shock absorber 10. The intermediate tube 26 surrounds the inner tube 14. Along with the tube 26, the end cap 28 and the seal assembly 24, the intermediate tube 26 defines a fixed volume reservoir chamber 30. The chamber 30 is filled, in part, with a compressible gas and in part, with hydraulic fluid. As will be described in detail, the compression head assembly 22 regulates flow of hydraulic fluid between the compression chamber 18 and the reservoir chamber 30. When the piston 12 moves down in the cylinder 14, during compression, the portion of the fluid of the compression chamber 18 which does not flow into the rebound chamber 20, flows into the reservoir chamber 30.

The lower mounting connector and the upper end 32 of the piston rod 12 provide for mounting of the shock absorber 10 in a vertical position as in FIG. 1, or a tilted position similar to the position of FIG. 1. So mounted, the shock absorber 10 is connected between a vehicle wheel and a vehicle body, to dampen vibrations of the body in response to movement of the wheel, and thereby provide a safe, comfortable ride for the vehicle occupants and contents.

In another principal aspect, the preferred embodiment of the present invention is the compression head assembly 22. Three functions are accomplished by the assembly 22. First, during a compression stroke of the piston rod 12, as may be caused by upward movement of the vehicle wheel, the assembly 22 regulates the flow of hydraulic fluid from the compression chamber 18 to the reservoir chamber 30. Second, during recoil, the assembly 22 allows relatively unrestricted return flow of hydraulic fluid of the compression chamber 18. Third, during relatively high upward acceleration of the vehicle wheel, the assembly 22 provides a uniquely decreased resistance to flow from the compression chamber 18 to the reservoir 30, thereby cushioning the vehicle body, its occupants, and contents from the acceleration.

To accomplish these functions, the assembly 22 includes a compression head 34, a pin 36, a cup 38, a disk valve 40, a clip 42, a spring 44 and a sliding mass 46. The first two functions are accomplished by flow past the disk 40, while the third is accomplished by flow through the pin 36.

Figure 2:
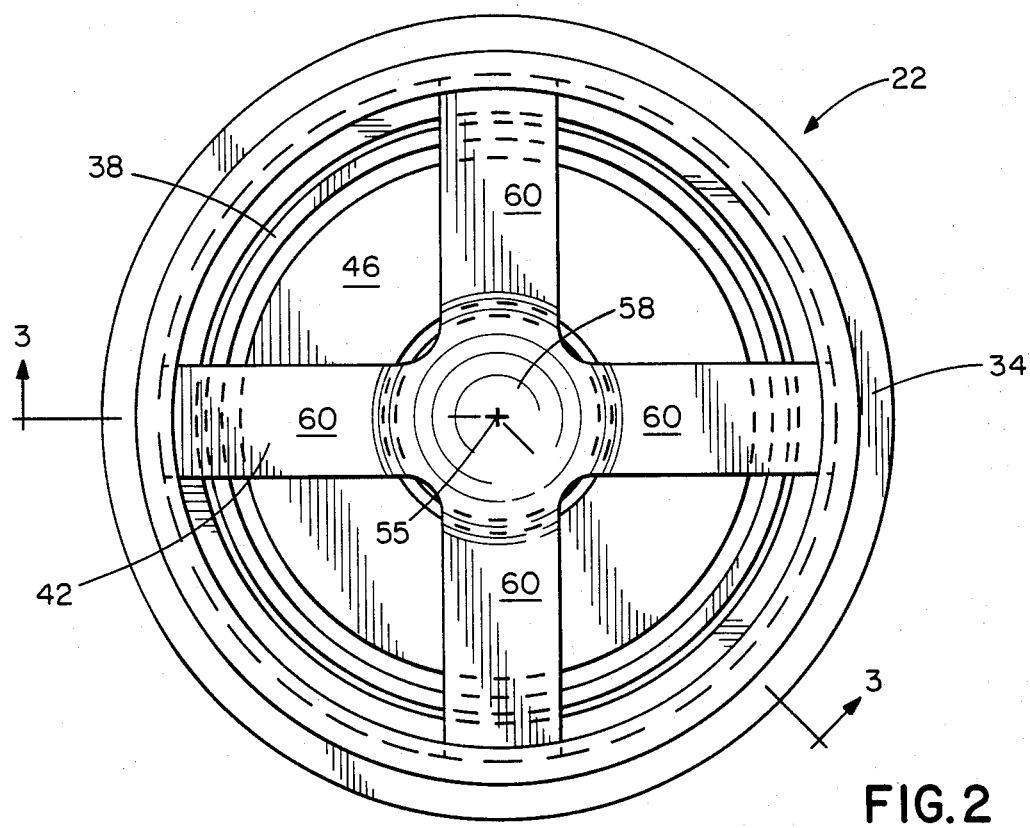
FIG. 2 is a plan view of the improved compression head.
Figure 3:
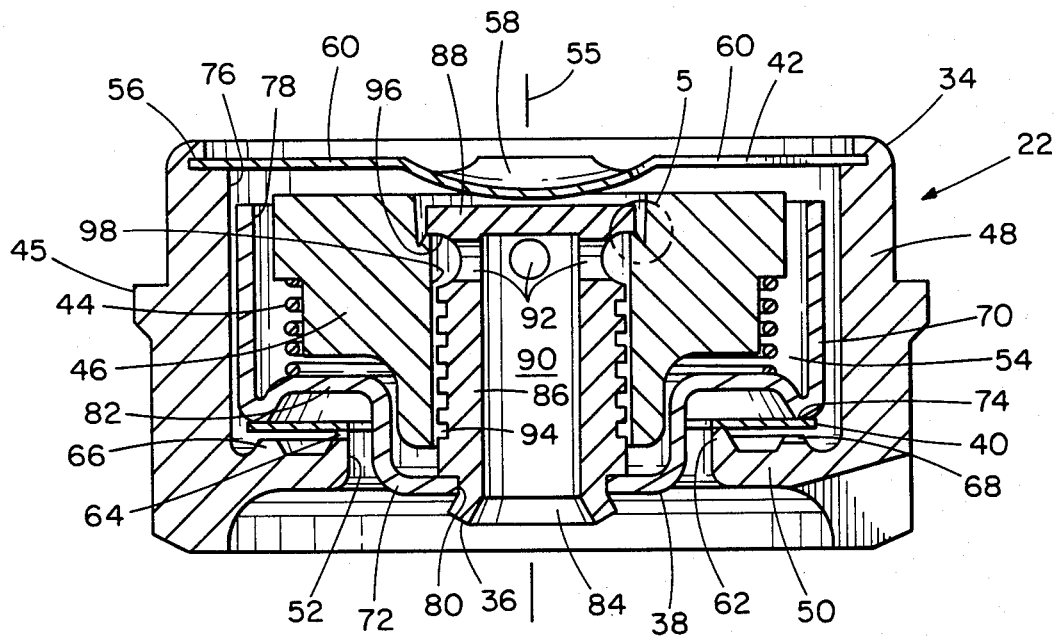
FIG. 3 is a cross-sectional view of the improved compression head, taken along line 3—3 of FIG. 2.

Referring to FIGS. 2 and 3, where the assembly 22 is shown in cross-section and at rest, the head 34 is of a generally annular shape. The head 34 includes an outer wall portion 48 which radially encompasses the other elements 36, 38, 40, 42, 44 and 46 of the assembly. As stated above, the head assembly 22 caps the lower end of the tube 14. For this purpose, an outer flange 45 of the head 34 is adapted to abut the end of the tube 14.

A valve seat ledge portion 50 of the head 34 projects inward of the wall portion 48 adjacent one end of the wall portion 48. The ledge portion 50 defines a circular opening 52 through the bottom of the head 34, while the wall portion 48 above the ledge portion 50 defines a larger cylindrical space 54. The head 34 and its portions 48, 50 are all symmetrical about an assembly and shock absorber centerline 55. The opening 52 and space 54 are centered on centerline 55. The opening 52 and space 54 open into each other, and the space 54 is open through the top of the head 34. Along the outer, upper edge of the space 54, the upper end of the wall portion 48 defines an annular, outwardly extending recess 56 for the clip 42.

The clip 42 includes a central, downwardly curved portion 58 and four equally spaced, radially extending spring legs 60. The clip 42 is formed of spring steel, and the outer tips of the legs 60 are fitted in the recess 56. The assembly elements 36, 38, 40, 44 and 46 are loosely held within the head 34 by the clip 42.

Figure 4:
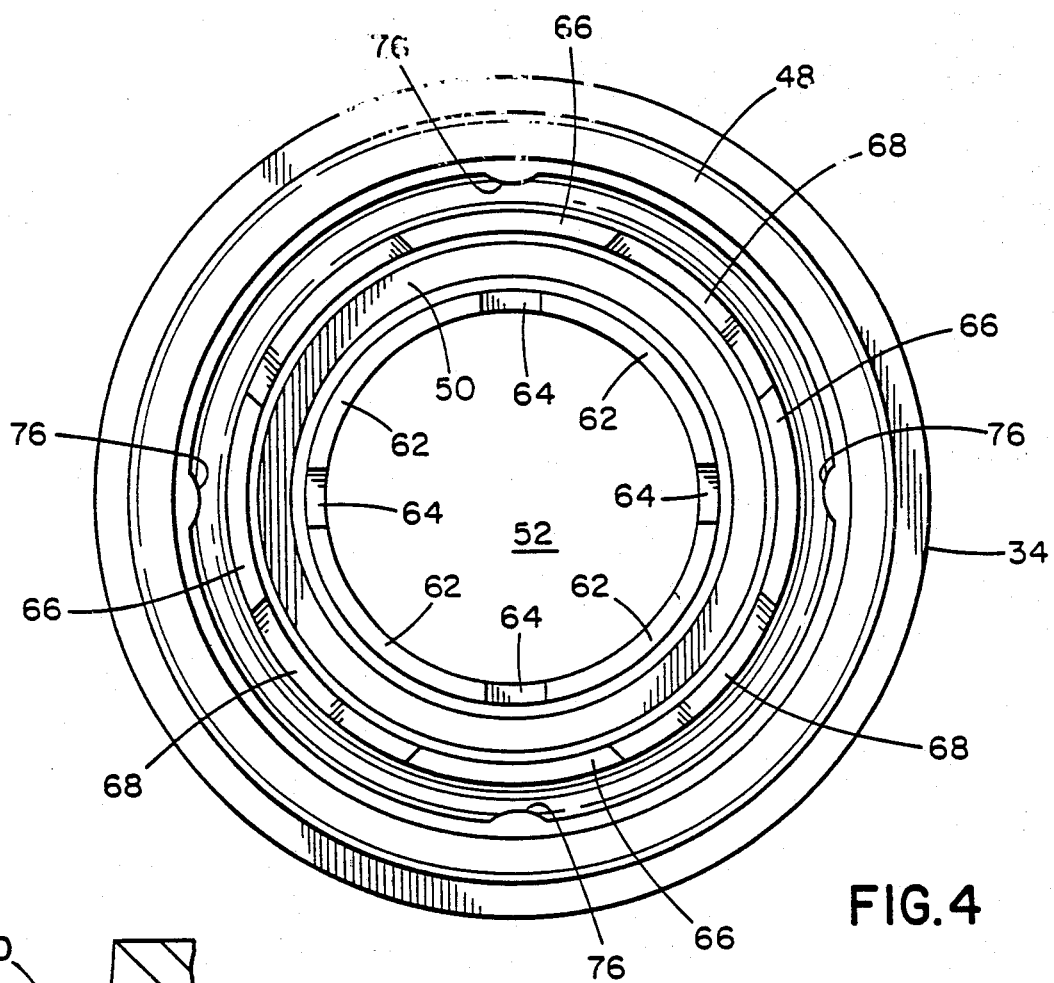
FIG. 4 is a plan view of the outer enclosure of the improved compression head.

The elements 36, 38, 40, 44 and 46 are free to move within the confines of the head 34 and clip 42. The disk 40 is planar and annular, like a washer, and made of spring steel. The disk 40 rests atop the head ledge portion 50. As best shown in FIG. 4, two circular series of arcuate, circumferentially spaced valve seats and valve slots are located on the ledge portion 50. An inner series of arcuate valve seats, designated the orifice valve seats 62, are separated by arcuate orifice slots 64. An outer series of arcuate valve seats, designated the restriction seats 66, have a lesser height than the orifice seats 62, and are separated by restriction slots 68. Returning to FIG. 3, disk 40 rests atop the orifice valve seats 62, and has an inner diameter substantially the same as the inner diameter of the orifice valve seats 62.

The cup 38 rests atop the disk 40. Stamped of cold drawn steel, the cup 38 includes an upper, larger portion 70 and a lower, smaller portion 72. Like the head 34, the cup 38 is symmetrical about the central axis 55. An outer, downwardly depending corner 74 of the cup upper portion 70 rests on the outer fringe of the disk 40.

The cup 38 is loosely mounted in the space 54 of the head 34, for sliding movement toward and away from the head ledge 50 and the clip 42. Returning to FIG. 4, three or more equally spaced, inwardly extending guides 76 along the inner surface of the head wall portion 48 guide the sliding movement of the cup 38. As shown by comparing the left and right halves of FIG. 3 (note the section line 3—3 of FIG. 2), the guides 76 limit lateral, or side-to-side, movement of the cup 38 and the disk 40, while between the guides 76, fluid flow paths are provided along the outside of the cup 38 from the area of the disk 40 to the top of the assembly 22.

The cup 38 defines an internal, mass-receiving chamber 78 within its upper and lower portions 70, 72, and a pin opening 80 at the lower end of the lower portion 72. Intermediate the portions 70, 72, the cup 38 includes a laterally extending spring supporting portion 82.

The pin 36, which can be made of free machining brass, is mounted on the cup 38. A lower end 84 of the pin 36 is flared to fix the pin 36 to the cup 38.

The pin 36 extends upward of its end 84 to a height substantially equal to that of the cup 38. The pin is centered on the axis 55, symmetrical thereabout, and includes a central portion 86. A centered passage 90 extends into the pin 36 from the end 84 through the central portion 86 to an enlarged head 88. The passage ends behind the head 88, where one or more circumferentially spaced, radially directed ports 92 open the passage 90 to the exterior of the pin 36. Annular grooves 94 below the ports 92 define a labyrinth seal on the pin 36.

Figure 5:
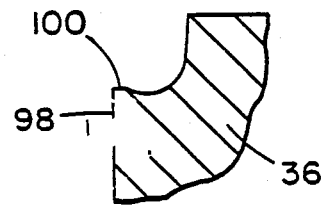
FIG. 5 is a detail view of a valve seat of the improved compression head, within the area encircled by the circle 5 in FIG. 3.

The sliding mass 46 is mounted for sliding movement on the pin 36, and the lower surface 96 of the head 88 functions as a valve seat for the mass 46. That is, the mass 46 defines a centered opening 98 into which the pin 36 is inserted from above. At the upper end of the opening 98, the mass 46 further defines an upwardly directed valve surface 100, as best shown in FIG. 5. The surfaces 96, 100 mate to define a valve which controls passage of hydraulic fluid into the mass opening 98, through the ports 92 and out the pin passage 90. Movement of the mass 46 down relative to the pin 36 separates the surfaces 96, 100, opening this valve; and movement of the mass 46 up relative to the pin 36 closes together the surfaces 96, 100, closing this valve.

Thus, the surface 96 acts as a valve seat, as stated. The surface 96 also acts to limit upward movement of the mass 46 relative to the pin 36.

The spring 44 interposes the mass 46 and cup 38. The spring 44 rests atop the surface 82 of the cup 38, and the mass 46 rests atop the spring 44. The mass 46 may be formed of cold drawn steel, while the spring 44 is wound of hard drawn spring steel or music wire.

Figure 6:
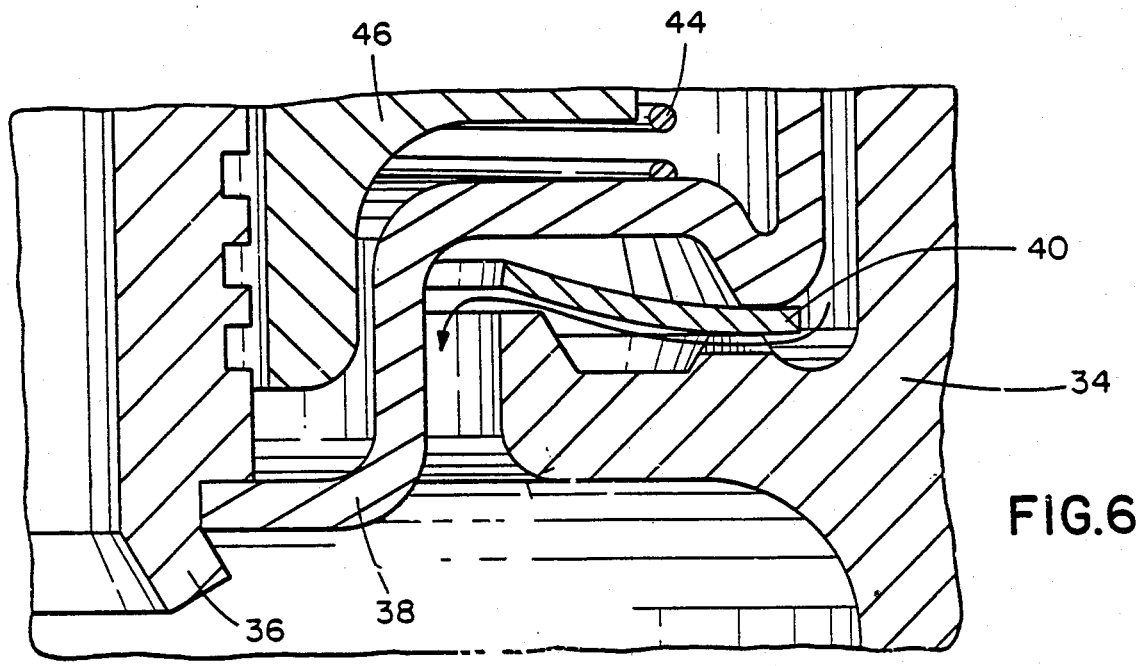
FIG. 6 is a detail view of valving of the improved compression head, during a first state of active operation.

In the operation of the shock absorber 10, low upward acceleration of the shock absorber body and compression head assembly 22 causes little or no movement of the mass 46 relative to the pin 36. The lower surface of the mass 46 has pressure applied to it for a total force about equal to that applied to the upper surface of the mass 46. Thus, there is no significant pressure differential across the mass 46, no movement of the mass 46, and no fluid flow through the pin 36. However, pressure in the compression chamber 18 acts on the cup 38 and disk 40. Initially, the cup 38 and disk 40 remain as depicted in FIG. 3, with hydraulic fluid flowing under the disk 40 through the orifice slots 64 in the head ledge portion 50. As pressure increases, the cup 38 flexes the disk 40 until its outer fringe contacts the restriction valve seats 66. The inner fringe of the disk 40 may lift away from the orifice valve seats 62, as in FIG. 6. Fluid then flows through the restriction slots 68, and over the orifice valve seats 62.

Figure 7:
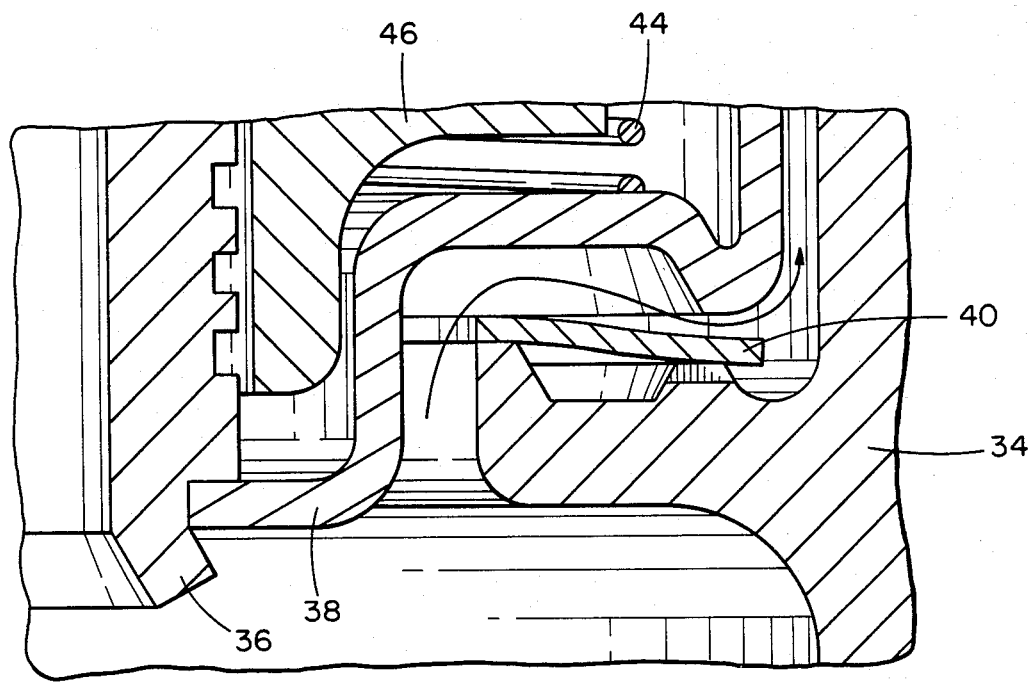
FIG. 7 is a view similar to FIG. 6, with the valving in a second state of active operation.
Figure 8:
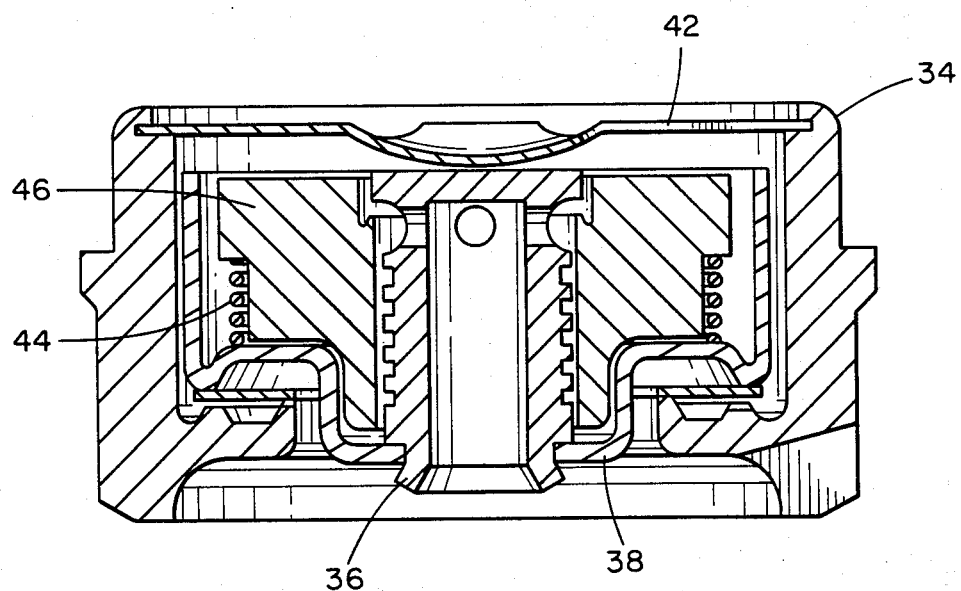
FIG. 8 is a view similar to FIG. 3, with the inertial valve of the improved compression head in active operation.

On recoil, the cup 38 again moves under pressure. The cup 38 separates from the disk 40, as in FIG. 7. Replenishing flow then occurs between the cup 38 and disk 40, bypassing the slots 64, 68. Again, with no significant acceleration, the mass 46 is unmoved relative to the pin 36. No flow occurs through the pin 36.

With the beginning of significant acceleration, on compression, the inertia of the mass 46 causes it to tend to stay at rest, while the remainder of the assembly 22 moves upward. Thus, the pin 36 moves upward relative to the mass 46, compressing the spring 44 and opening a gap between the pin head surface 96 and the mass surface 100. Fluid then flows between the surfaces 96, 100, through the ports 92 and out the pin passage 90, as well as past the disk 40, to the reservoir 30.

When the acceleration ceases, the spring 44 moves the mass upward and returns the mass 46 to its rest position as shown in FIGS. 2 and 3, and flow continues only past the disk 40. No flow occurs through the pin 36 on recoil, whatever the acceleration, because contact between the surfaces 96, 100 prevents such flow.

The present invention and the manner and process of making and using it are now described in such full, clear, concise and exact terms as to enable a person of ordinary skill in the art to make and use the same. As should be apparent, a variety of modifications could be made to the structure of the preferred embodiment. As an example, the orifice slots 64 could be located in the downwardly depending corner 74 of the cup 35. Therefore, to particularly point out and distinctly claim the subject matter regarded as invention, the following claims conclude this specification. All variations which come within the scope and spirit of the claims are intended to be embraced therein.

What is claimed is:

1. An improved compression head assembly for an automotive shock absorber, providing (a) regulated flow from a compression chamber to a reservoir during shock absorber compression, (b) relatively unrestricted flow from the reservoir to the compression chamber during shock absorber recoil, and (c) a uniquely decreased resistance to flow from the compression chamber to the reservoir during relatively highly accelerated shock absorber compression; the compression head assembly comprising:

a compression head with a wall portion and a ledge portion, the head defining a space within the wall portion and an opening through the ledge portion;

a valve disk loosely mounted in the space adjacent the orifice;

a cup slidably mounted in the space adjacent the disk and defining a chamber, the cup and compression head ledge portion cooperatively defining thereon orifice and restriction valve seats with orifice and restriction valve openings among the orifice and restriction valve seats;

a pin mounted to the cup in the chamber, the pin defining a passage therethrough;

a mass slidably mounted to the pin in the chamber for movement to and from a position closing the passage;

means in the chamber for biasing the mass to the position closing the passage;

and means for retaining the disk, cup, pin, mass and biasing means in the space defined by the head;

whereby the regulated flow and the relatively unrestricted flow occur through the orifice and restriction slots as permitted by the valve disk, and the flow during the uniquely decreased resistance to flow occurs through the passage when shock absorber acceleration moves the mass relative to the pin to open the passage.

2. A compression head assembly as in claim 1 in which the orifice and restriction valve seats are on the compression head ledge portion.

3. A compression head assembly as in claim 1 in which the biasing means includes a spring between the mass and cup.

4. A compression head assembly as in claim 1 in which the retaining means includes a clip with spaced spring legs fitted to the head.

5. A compression head assembly as in claim 1 in which the pin includes a head having a valve seat surface, in which the passage ends behind the head in ports, and in which the mass includes a valve surface mating with the valve seat surface of the pin head.

6. A compression head assembly as in claim 5 in which the pin extends from the cup to the head, and in which the biasing means biases the mass away from the cup to the position closing the valve.

7. A compression head assembly as in claim 1 in which the pin defines a labyrinth seal with the mass.

8. A compression head assembly as in claim 1 in which the disk rests atop the ledge portion, and the cup rests atop the disk.

9. A compression head assembly as in claim 1 in which the mass includes opposed surfaces adapted to be substantially equally exposed to hydraulic fluid, whereby hydraulic fluid pressure within a shock absorber causes no significant pressure differential across the mass.

* * * * *